United States Patent [19]

Crouse et al.

[11] Patent Number: 5,309,426
[45] Date of Patent: May 3, 1994

[54] HIGH PERFORMANCE CASCADABLE SIMPLEX SWITCH

[75] Inventors: Richard S. Crouse, Boca Raton, Fla.; John J. Cazzolla, Cary, N.C.; Luke L. Chang, Boca Raton, Fla.; Marco M. Hurtado, Boca Raton, Fla.; Kha D. Nguyen, Boca Raton, Fla.; Jose L. Rivero, Baco Raton, Fla.; Jose J. Ruiz, Baco Raton, Fla.; Louis Salcedo, Delray Beach, Fla.

[73] Assignee: International Business Machines Corporation, New York, N.Y.

[21] Appl. No.: 8,925

[22] Filed: Jan. 26, 1993

[51] Int. Cl.⁵ .............................................. H04Q 1/00
[52] U.S. Cl. ..................................... 370/58.1; 370/60; 340/825.02; 340/825.79
[58] Field of Search ........................ 370/54, 58.1, 58.2, 370/58.3, 60, 60.1, 63, 94.1, 61.66; 340/825.02, 825.5, 825.79, 825.8, 825.83

[56] References Cited

U.S. PATENT DOCUMENTS

| | | | |
|---|---|---|---|
| 4,679,191 | 7/1987 | Nelson et al. | 370/84 |
| 4,752,777 | 6/1988 | Franaszek | 340/825.79 |
| 4,875,206 | 10/1989 | Nichols et al. | 370/85.15 |
| 4,914,429 | 4/1990 | Upp | 370/58.1 |
| 4,922,486 | 5/1990 | Lidinsky et al. | 370/60 |
| 4,965,798 | 10/1990 | Mostafa et al. | 370/79 |
| 4,968,977 | 11/1990 | Chinnaswamy et al. | 370/58.1 |
| 4,975,695 | 12/1990 | Almond et al. | 340/825.79 |
| 5,005,171 | 4/1991 | Modisette, Jr. et al. | 370/110.1 |
| 5,051,982 | 9/1991 | Brown et al. | 370/58.2 |
| 5,051,984 | 9/1991 | Mostafa et al. | 370/79 |
| 5,123,011 | 6/1992 | Hein et al. | 370/58.1 |

Primary Examiner—Douglas W. Olms
Assistant Examiner—Alpus H. Hsu
Attorney, Agent, or Firm—Calfee Halters & Griswold

[57] ABSTRACT

A serial simplex switch design is provided which includes I/O ports each of which is configurable specifically for attachment to a data communications subsystem or, alternatively, for cascaded connection to a similarly configured I/O port on another switch. The switch provides a packet routing function including input and output buffers for each of its I/O ports wherein packets of control messages sent by one subsystem are temporarily stored prior to being delivered to the appropriate destination subsystem. When configured to be directly attached to a subsystem, the I/O ports separate control messages from incoming integrated data and control message strings. In a cascade configuration, however, a mechanism is provided wherein data and control messages are separated into two physical paths to eliminate the delays associated with integrated data and control message flow through the cascaded I/O port. Each I/O port is configurable to either of these methods of operation by means of programmable latches associated with the I/O port.

12 Claims, 3 Drawing Sheets

| CASCADE LATCH | OB-ONLY LATCH | IB-ONLY LATCH | PORT DEFINITION |
|---|---|---|---|
| 0 | X | X | SUBSYSTEM ATTACHED IB & OB FRAMES INTEGRATED |
| 1 | 0 | 0 | SWITCH CASCADE IB & OB FRAMES INTEGRATED |
| 1 | 0 | 1 | SWITCH CASCADE IB FRAMES ONLY |
| 1 | 1 | 0 | SWITCH CASCADE OB FRAMES ONLY |

FIG. 3

HIGH PERFORMANCE CASCADABLE SIMPLEX SWITCH

FIELD OF THE INVENTION

The present invention relates generally to switches for interconnecting subsystems in data communications systems and more particularly to a high performance cascadable simplex switch for use in such a system.

BACKGROUND OF THE INVENTION

Data communications systems which include more than one communications subsystem typically utilize a serial crossbar switch to functionally interconnect the subsystems. A serial crossbar switch is a hardware device which permits high-speed serialized data communication between the subsystems. The switch physically attaches to each subsystem by means of an input/output (I/O) port comprising an individual pair of optical fibers or wires. One of the pair of fibers or wires for each subsystem is used for transmitting information to other systems through the switch, and the other is used for receiving information from other systems via the switch.

The internal switching fabric of the serial crossbar switch provides for connections between any two connected subsystems. The subsystems communicate with each other over these connections, or data paths, which logically establish connections between the transmit wire of a source (or calling) subsystem with a receive wire of a destination (or called) subsystem. In this manner, the switching fabric of the serial crossbar switch provides internal connection crosspoints which eliminate connection blocking. Connections between more than one pair of subsystems may exist concurrently. This concurrency gives the serial crossbar switch a significant performance advantage over single threaded interconnects such as serial ring networks, wherein only one connection between subsystems is permitted at a time.

The communications which occur between subsystems via the serial crossbar switch consist of data and data acknowledgement control messages. The control messages may precede or follow the data which is sent over the switch, and provide information to the source and destination subsystems relating to the data transmitted. For example, calling subsystems request connections to and subsequent disconnections from other called subsystems via the switch by sending serially encoded connect request and disconnect request link level control messages to the called subsystems. The called subsystem responds to the calling subsystem request with a control message either acknowledging or not acknowledging the request. In addition, data acknowledge messages or error messages are sent by a called subsystem to a calling subsystem after a data transfer sequence has been completed. Because an acknowledgement message from the called subsystem indicates to the calling subsystem whether or not data has been lost during transmission, a data sequence transmission cannot be considered to have been successfully completed until the calling subsystem receives positive acknowledgement messages for each transmitted data sequence.

Conventional serial crossbar switch designs operate on the basis of full duplex connectivity. In a full duplex connection, the switch logically connects the transmit wire of the calling subsystem to the receive wire of the called subsystem, while simultaneously logically connecting the transmit wire of the called subsystem to the receive wire of the calling subsystem. In this manner, each subsystem has a simultaneous communication path to and from the other connected subsystem in which to transfer control messages and data. One disadvantage of full duplex connectivity, however, is that communications between the subsystems is unidirectional along the separate transmit and receive paths. The data is transmitted along the transmit wire of the calling subsystem to the receive wire of the called subsystem, with only an occasional link level data acknowledgement control message sent in return along the transmit wire of the called subsystem to the receive wire of the calling subsystem. This underutilization of the reverse data path in a full duplex connection results in wasting nearly half of the potential throughput capacity of a serial crossbar switch.

The wasted throughput capacity of a full duplex switch design may be recovered if a switch is instead designed to operate on the basis of simplex connectivity. In a simplex connection, a switch logically connects the transmit wire of the calling subsystem to the receive wire of the called subsystem. However, unlike the full duplex connection, a simplex connection does not provide a separate reverse path for returning control messages. Control messages addressed to the called subsystem may be received by the called subsystem from other subsystems on its receive link, and control messages sent by the calling subsystem may be sent to other subsystems on its transmit link. The transmit link of the called subsystem is available to allow the called subsystem to establish connections with other subsystems, while at the same time, the receive link of the calling subsystem is available to allow connections to the calling subsystem from other subsystems.

Because a simplex switch does not allocate independent reverse connection paths, a different technique must be provided to route the required data acknowledgement control messages from a called subsystem to a calling subsystem. Two approaches are generally recognized for accomplishing this. First, upon completion of a data transfer, the subsystem that received the data may become a calling subsystem by requesting a connection to the subsystem that sent the data and which is now a called subsystem. The data acknowledgement control messages are then sent along this connection.

Alternatively, the simplex switch may provide a packet router function to route data acknowledgement control messages to the appropriate subsystems without establishing connections between the subsystems. The switch accomplishes its packet router function without establishing connections between the subsystems by a store-and forward technique wherein control messages are temporarily stored in buffers in the switch prior to delivery to the appropriate subsystem. Of these two simplex design techniques, the store-and-forward packet routing method is technically preferred because of the speed advantage achieved by eliminating the switching time delays associated with establishing switch connections.

Simplex serial crossbar switches provided with a store-and-forward function, however, may not be easily cascaded with other like switches in systems having more subsystems than one switch can accommodate. The data throughput performance of a system interconnected by such a simplex switch depends on the speed in which the link layer control messages are routed between subsystems by the switch. Because two cascaded switches, each having subsystems attached thereto, are typically connected by a single I/O port to construct such a system, bottlenecks are likely to occur as a result of the large number of link layer control messages sent through this I/O port between the group of subsystems attached to the first switch of the cascaded pair and the group of subsystems attached to the second switch.

The ratio of the required buffer size at a cascade I/O port to the buffer size at a subsystem attached I/O port is equal to the ratio of the maximum number of control messages that can pass through the cascade I/O port to the maximum number of control messages that can pass through the subsystem attached I/O port. Because the number of control messages passing through the cascade I/O port is typically much greater than that passing through a subsystem attached I/O port, the size of buffers at the cascade I/O port must be significantly greater than those at a subsystem attached I/O port. If not, system performance will be hampered by delays introduced by control message flow at the cascade I/O port.

Accordingly, there is a need for an improved simplex store-and-forward serial crossbar switch design having I/O ports which may be used in either a subsystem attached configuration a cascaded configuration, without uniquely designing expanded buffer sizes at the I/O ports operating in a cascade configuration. It is an object of the present invention, then, to provide a design scheme for such a switch without adversely affecting switching performance and without unnecessarily increasing the buffer size at subsystem attached I/O ports.

SUMMARY OF THE INVENTION

The present invention provides a serial simplex switch design which includes I/O ports each of which may be configured specifically for attachment to a communications subsystem or, alternatively, for cascaded connection to a similarly configured I/O port on another switch. The switch provides a packet routing function including input and output buffers for each of its I/O ports wherein packets of control messages sent by one subsystem are temporarily stored prior to being delivered to an appropriate destination subsystem.

The packet routing function of the serial simplex switch of the present invention is implemented by defining a fixed amount of serial transmission bandwidth within the total switch transmission bandwidth as reserved for routing data acknowledgement control messages, or out-of-band (OB) message frames. Accordingly, data frames that are transferred within connections established by the switch are collectively referred to as inband (IB) data traffic, and link level data acknowledgement control message frames that are transferred via the packet router function are collectively referred to is out of band (OB) message traffic.

The OB message bandwidth is created by requiring subsystems to separate successive IB data frame transfers by a string of idle character transfers. OB message frames may be imbedded in an idle character string between two successive IB data frames, resulting in an integrated byte string of IB data and OB control messages on a single physical path. A calling subsystem routes an OB message frame to a receiving subsystem through the switch by inserting one or two OB message frames within the idle byte string separating the IB data frames.

The I/O port attached to the calling subsystem removes the OB message frame from the integrated byte string of IB data and OB control messages which it receives and restores the character span to its idle state. Data is transferred from an I/O port to a switching matrix in the switch over dedicated data input buses. The switched data is then transferred from the switching matrix to a second I/O port over dedicated data output buses, for subsequent transmission to an appropriate subsystem. The removed OB message frames are stored in an input buffer for that particular I/O port.

In round robin fashion, each of the I/O ports of the switch take turns routing the stored OB frames from their respective input OB buffers, across an OB bus, and on to a destination I/O port which is attached to the subsystem for which the control message frames are destined. The destination I/O port stores these control frames in an output buffer. When the destination I/O port detects an idle byte sequence between successive IB data frames incoming on the dedicated data output buses, which frames are to be transferred to that I/O port's attached subsystem, it replaces the idle bytes with one or more OB control messages contained within the output OB buffer.

When configured to be directly attached to a subsystem, the I/O port will continue to separate OB control message frames from incoming integrated IB data/OB control frames. In a cascade configuration, however, a mechanism is provided wherein the IB and OB frames are separated into two physical paths to eliminate the delays associated with integrated IB data/OB control frame flow through the cascaded I/O port. Each I/O port is configurable to either of these methods of operation by means of programmable latches associated with the I/O port.

In the cascaded configuration, a pair of I/O ports functions as a single cascaded I/O port, and the IB data frames and OB data acknowledgement frames are separated. The OB message and IB data frames are each routed through one of the pair of I/O ports. These two I/O ports, however, continue to operate as a single coordinated cascade function. Accordingly, with corresponding I/O ports on cascaded switches similarly configured, one of the pair of I/O ports will exclusively handle OB message traffic and the other I/O port will exclusively handle IB data traffic. By removing IB frame flow from the OB frame flow at the OB only cascade I/O port, the switch is able to provide a continuous string of idles for routing OB frames between switches. This manner of operation eliminates the performance loss associated with halting OB transfer at the cascade path during IB frame flow.

BRIEF DESCRIPTION OF THE DRAWINGS

FIG. 3 is a chart outlining the possible I/O port configurations for the simplex switch of FIG. 1.

DETAILED DESCRIPTION OF THE PREFERRED EMBODIMENT

Figure 1:
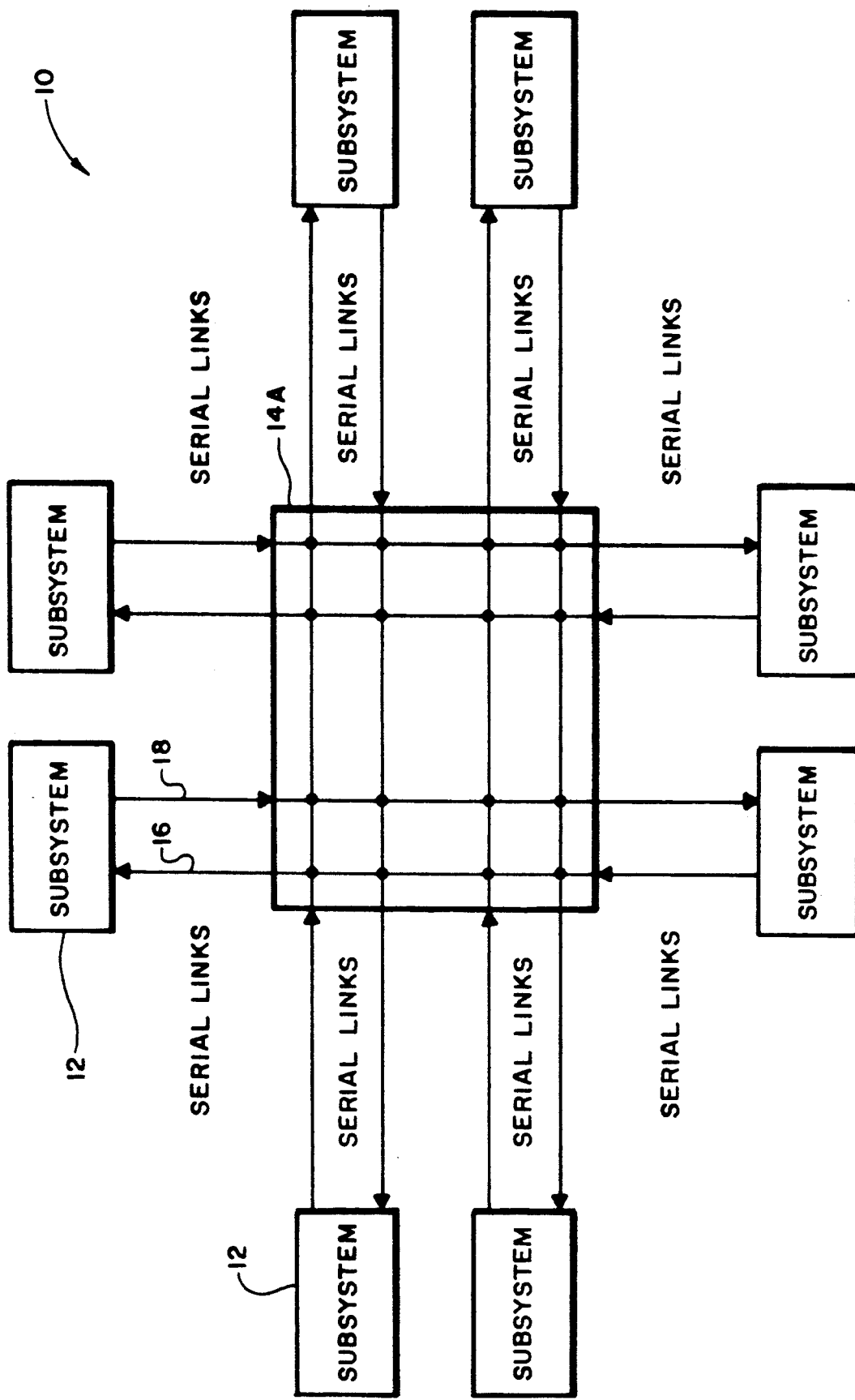
FIG. 1 is a block diagram of a communications system which includes a simplex switch constructed according to the principles of the present invention.

FIG. 1 is a block diagram of a data communications system 10 which comprises a plurality of subsystems 12 connected by a switch 14A constructed according to the principles of the present invention. The switch 14A is provided with an internal crosspoint switching fabric, distributed control logic for processing subsystem connection requests, and control logic to support the switch port input and output serial interfaces, as is known in the art of serial simplex switching. The switch architecture of the present invention provides link level protocols which support the implementation of packet routed store-and-forward subsystem-to-subsystem messaging.

The switch 14A is connected to the subsystems 12 by means of serial links, which may take the form of optical fibers or pairs of wires. One of the wires or cables is used as an incoming path 16 for reception of frames, which are units of control information and data transmission, and the other is used as an outgoing path 18 for transmission of frames. Although only eight subsystems are shown, up to sixteen subsystems may be interconnected by a single switch 14A. Expansion to greater than sixteen interconnected subsystems is accomplished by adding a second switch in a cascaded configuration.

Figure 2:
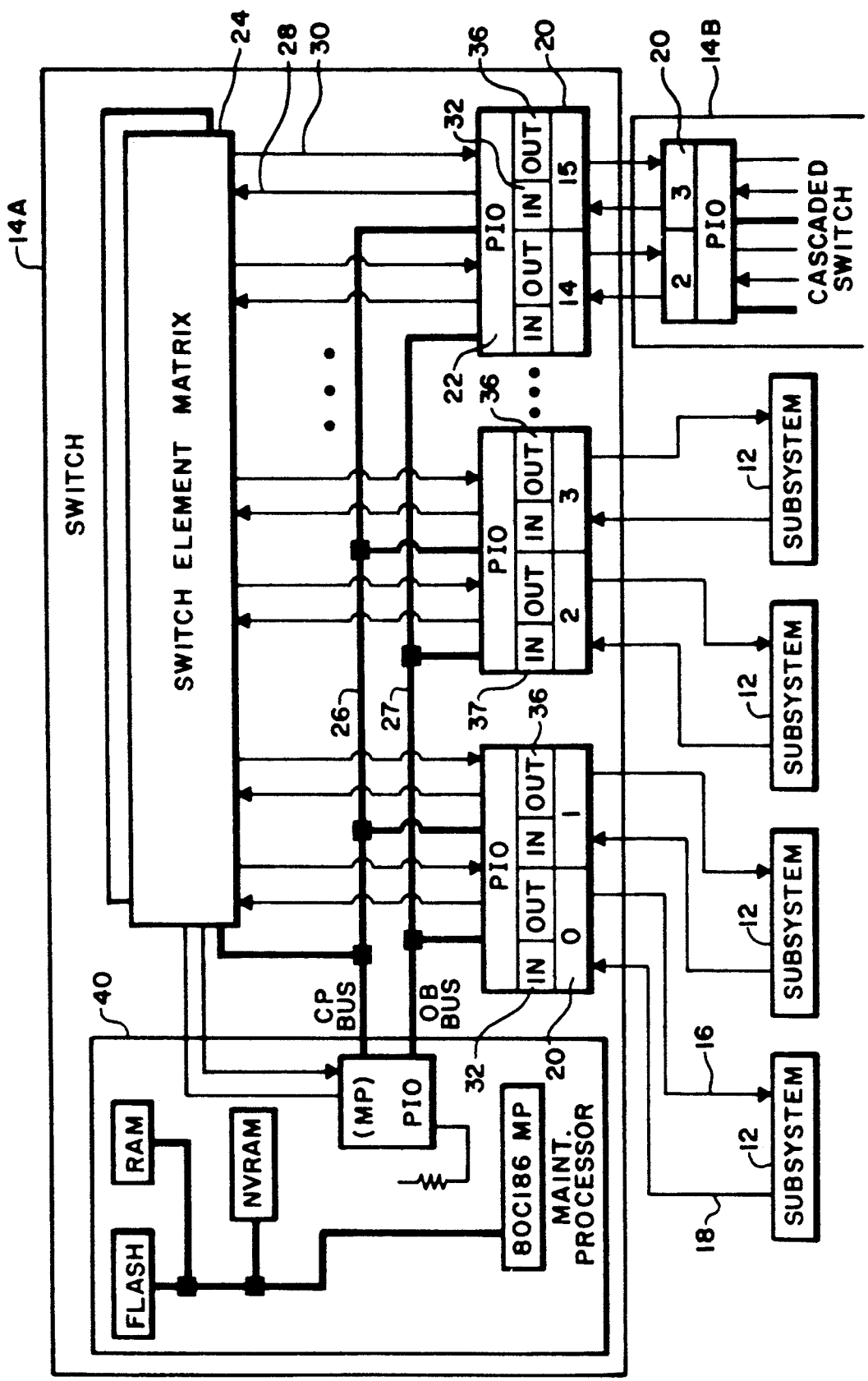
FIG. 2 illustrates in greater detail the internal construction of the simplex switch of FIG. 1.

FIG. 2 shows the internal construction of the simplex switch 14A in more detail. In addition, a second switch 14B is shown connected to switch 14A in a cascaded configuration at an external input/output (I/0) port 20, as will be further discussed below. Subsystems 12 within the system shown in FIG. 2 are attached to either switch 14A or 14B at additional (I/0) ports 20. Each of switches 14A and 14B is provided with sixteen such external I/O ports, indicated as I/O ports 0 through 15 in FIG. 2. The sixteen I/O ports 20 are provided by eight port input/output (PIO) modules 22, each of which modules provides a pair of I/O ports. The cascaded switch 14B is connected to switch 14A using one pair of I/O ports 20 on each of the switches. The input port control logic and output port control logic reside within the PIO modules 22.

The switches 14A and 14B operate in a simplex mode of operation to route data and control messages between interconnected subsystems 12, utilizing a store-and-forward function for control messages. In this simplex mode of operation, both incoming path 16 and outgoing path 18 for a particular subsystem carry both data and data acknowledgement control messages. Packets of control messages are temporarily stored in buffers contained within the switch prior to being delivered to an appropriate destination subsystem. There is no need to establish a connection between the interconnected subsystems during this packet routing procedure because the subsystem sending the control message can relinquish its connection to the switch once the switch has stored in its buffer the control message to be delivered.

A switch element matrix (SEM) module 24 provides the necessary crosspoint switch fabric logic for the switch 14A. Connection and disconnection operations are executed over a Connection Processing (CP) bus 26, which connects the SEM module 24 with each of the PIO modules 22 on a switch. It is over the CP bus 26 that calling subsystems request connections to and subsequent disconnections from other called subsystems by sending serially encoded connect request and disconnect request link level control messages to the called subsystems over the switch 14A. The switch responds by establishing the requested connections or disconnections.

An OB (out-of-band) bus 27 connects each of the PIO modules 22. Data acknowledgement control message frame routing occurs over the OB bus 27. Data is transferred from the PIO modules 22 to the SEM module 24 over dedicated SEM data input buses 28. The switched data is then transferred from the SEM module to a PIO module, over dedicated SEM data output buses 30 for subsequent transmission to an appropriate subsystem 12.

The packet routing function of the serial simplex switch of the present invention is implemented by defining a fixed amount of serial transmission bandwidth within the total switch transmission bandwidth as reserved for routing data acknowledgement control messages, or out-of-band (OB) message frames. These OB message frames include acknowledgement and non-acknowledgement messages, and error messages. The remaining bandwidth of the total switch transmission bandwidth is used to transfer data, or in-band (IB) frames. Accordingly, data frames that are transferred within connections established by the switch are referred to as inband (IB) data traffic, and link level data acknowledgement control message frames that are transferred via the packet router function are referred to as out of band (OB) message traffic.

The OB message bandwidth is created by requiring subsystems to separate successive IB data frame transfers by a string of idle character transfers. In the preferred embodiment, this idle string is 30 bytes in length. Because the OB data acknowledgement control messages are architected as 12 byte frames, two such OB message frames may be imbedded in a single 30 byte idle character string between two successive IB data frames, resulting in an integrated byte string of IB data and OB control messages on a single physical path. A calling subsystem 12 routes an OB message frame to a receiving subsystem through the switch 14 by inserting one or two OB message frames within the idle byte string separating the IB data frames.

The I/O ports 20 are each provided with an input FIFO buffer 32 and an output FIFO buffer 36 in which OB message frames are temporarily stored prior to being delivered to the appropriate destination subsystem. The I/O port 20 attached to the calling subsystem removes the OB message frame from the integrated byte string of IB data and OB control messages and restores the 30 byte character span to its idle state. The removed OB message frames are stored in the input FIFO buffer 32 for that particular I/O port. The data frames are transferred from that I/O port to a destination I/O port via the SEM module 24 over the dedicated SEM data input buses 28 and the dedicated SEM data output buses 30.

In round robin fashion, each of the sixteen I/O ports 20 of the switch 14 take turns routing the stored OB frames from their respective input OB FIFO buffers 32, across the OB bus 27, and on to a destination I/O port which is attached to the subsystem for which the control message frames are destined. The destination I/O port stores these control frames in its output FIFO buffer 36. When the I/O port 20 detects an idle byte sequence between successive IB data frames incoming on the dedicated SEM data output buses 30, which frames are to be transferred to that I/O port's attached subsystem, it replaces the idle bytes with one or more OB control messages contained within the output OB FIFO buffer 36. To prevent OB control messages from being lost due to FIFO overrun, the size of the input and output OB FIFO buffers 32, 36 is sufficient to handle the theoretical maximum number of OB frames that a given subsystem can send and receive. Accordingly, at each of the I/O ports 20 to which is attached a subsystem, no OB control message overrun can occur at the OB FIFO buffers 32, 36.

As shown in the cascaded configuration of FIG. 2, however, when an I/O port of switch 14A is connected to an I/O port of switch 14B in a system having more subsystems than one switch can handle, the input and output OB FIFO buffers 32, 36 for these connected I/O ports may not be of sufficient size to accommodate the OB control message flow which will occur at the cascade I/O port itself. If the byte strings transferred between the two cascade I/O ports retain their integrated form of OB message frames imbedded within successive IB data frames, delays will occur as a result of the large number of link layer control frames sent through the cascade I/O port between the group of subsystems attached to switch 14A and the group of subsystems attached to switch 14B. These delays result because a cascade I/O port must route OB message frames between every subsystem attached to switch 14A and every subsystem attached to switch 14B, whereas a subsystem I/O port need only carry OB message flow which is addressed either to or from its directly attached subsystem.

Accordingly, the switch design of the present invention provides for configurable PIO modules 22, wherein any of the I/O ports on the switch may be configured for either cascaded operation or directly attached subsystem operation. When configured to be directly attached to a subsystem, an I/O port 20 will continue to separate OB control message frames from incoming integrated IB data/OB control frames. In a cascade configuration, however, a mechanism is provided wherein the IB and OB frames are separated into two physical paths to eliminate the delays associated with integrated IB data/OB control frame flow through the cascaded I/O port.

Three control latches are provided within the switch port logic to support specific switch configurations. These three control latches are the switch cascade I/O port latch, the OB control only latch and the IB data only latch. At initialization time, a maintenance microprocessor 40 shown in FIG. 2 programs the three control latches to configure each PIO module 22 on the switch 14 by setting the status of bits in the PIO module corresponding to these three latches. The microprocessor 40 is included in order to support logic initialization and maintenance functions and is not involved in the normal subsystem to subsystem processing. The configuration of the three latches, as shown in the chart of FIG. 3 and as further described below, determines whether the information transferred through the switch via an I/O port remains in the form of integrated IB and OB frames, or whether the IB and OB messages are managed separately to improve system performance.

If the bit corresponding to the cascade only latch for a particular I/O module 20 is set to 0, each of the I/O ports on that module will function as a subsystem attached I/O port. The I/O ports will each be directly connected to a subsystem in the overall system 10. Accordingly, IB data frames and OB data acknowledgement frames will continue to be integrated during transmission. Under this I/O port configuration, the status of the OB control only latch and the IB data only latch are don't cares.

If the bit corresponding to the cascade only latch for a particular PIO module 22 is set to 1, the two I/O ports on that PIO module will function as a single cascaded I/O port. These two I/O ports will be directly connected to similarly configured I/O ports on a corresponding PIO module of another switch. During CP and OB bus cycle operations, an I/O port on switch 14A which initiates a CP or OB command will present the logical address of the I/O port targeted to receive the operation. If no other I/O port on switch 14A responds to this logical address, it is assumed that the destination port is not attached to switch 14A, and the cascaded PIO module 22 on switch 14A will accept the command and forward it to the similarly configured cascaded PIO module 22 on switch 14B, where it is assumed that the target of the operation will be found.

In the cascade configuration, IB data frames and OB data acknowledgement frames will either continue to be integrated during transmission, or will be separated if system performance dictates, depending on the state of the OB control only latch and the IB data only latch in the PIO module 22. If these two latches are set to a zero state, although the switch is in a cascade configuration, the IB and OB frames will continue to be integrated for the particular I/O port. This particular configuration is useful where two switches must be cascaded to accommodate more subsystems than one switch can manage, but the volume of OB data acknowledgement frames anticipated through the switch to switch interface does not necessitate separation of the OB and IB frames.

However, if either the IB data only latch or the OB control only latch, but not both, are set to one on the cascaded PIO module of switch 14A, the I/O ports on this module functions as a single cascaded I/O port, and the IB data frames and OB data acknowledgement frames are separated. The OB message and IB data frames are each routed through one of the two I/O ports on the PIO module. These two I/O ports, however, continue to operate as a single coordinated cascade function. The corresponding PIO module on switch 14B will require (i) configuration of the status of IB data only latch to be zero (if the IB control only latch on switch 14A is set to one) or one (if the IB control only latch on switch 14A is set to zero) and (ii) configuration of the status of OB data only latch to be zero (if the OB control only latch on switch 14A is set to one) or one (if the OB control only latch on switch 14A is set to zero). These two configurations are implemented by using the states of the IB control only latch and the OB data only latch to disable the I/O port logic from responding to OB and CP bus cycles, respectively. In this manner, the IB only cascaded I/O port will only recognize CP bus cycles so as to only receive IB frame flow, while the OB only cascade I/O port will only recognize OB cycles so as to only receive OB frame flow.

Accordingly, with corresponding I/O ports 20 on switches 14A and 14B so configured, the switch-to-switch interface connecting switches 14A and 14B will comprise both of the I/O ports 20 on a particular PIO module 22. The I/O port having its OB only latch status set to one will exclusively handle OB message traffic and the I/O port having its IB only latch status set to one will exclusively handle IB data traffic. By removing IB frame flow from the OB frame flow at the OB only cascade I/O port, the switch is able to provide a continuous string of idles for routing OB frames between switches. This manner of operation eliminates the performance loss associated with halting OB transfer at the cascade path during IB frame flow.

To prevent overrun of the input OB FIFO buffer at the OB only cascade I/O port, the input OB FIFO buffer is able to transfer OB frames to the OB bus faster than it can receive OB frames from the switch-to-switch interface. Because the input OB FIFO can be emptied faster than it can be filled, it will never reach a full condition.

Specifically, the OB bus responds to requests from input I/O ports to access the OB bus by generating a prioritized round-robin bus arbitration sequence. When a subsystem attached I/O port wins the arbitration sequence, it is permitted to transfer only one OB message. It must then release the OB bus for another bus arbitration sequence. The OB only cascade I/O port has priority access to the OB bus because the OB bus arbitration logic is designed to recognize the OB only cascade I/O port bidding for the OB bus and grant it access ahead of other subsystem attached I/O port requests. After the OB only cascade I/O port wins the OB bus, it is allowed to perform continuous OB message transfers until its input OB FIFO is empty. By designing the OB bus arbitration sequence to take a non-zero amount of time to complete, it follows that successive OB message transfers from the OB only cascade I/O port to the OB bus will occur faster than an equal number of OB messages from subsystem attached I/O ports to the OB bus, because the subsystem attached I/O ports, unlike the cascade I/O port, are delayed by arbitration cycles. Thus, because the OB only cascade within a switch is incapable of receiving OB messages from the subsystems as quickly as they can be sent by the OB only cascade I/O port within the cascaded switch to their destination subsystems, the input OB FIFO of the OB only cascade I/O port can never be overrun.

Further, to prevent overrun of the output OB FIFO buffer at the OB only cascade I/O port, the output OB FIFO buffer is able to reject OB bus cycles when its condition is full, thereby eliminating the potential for output OB FIFO overrun. If such an OB cycle is rejected, the input port logic at the I/O port which had initiated the OB bus cycle terminates the cycle and retains the OB frame in its input OB FIFO buffer. Because this buffer is designed to hold the maximum number of OB frames that a subsystem attached to that I/O port can send or receive, this internal FIFO also cannot be overrun.

Specifically, the OB bus includes a signal designated "OB REJECT". If the output OB FIFO of the OB cascade only I/O port is full, and an OB bus cycle occurs from another I/O port attempting to transfer an OB message to it, then the OB only cascade I/O port will activate the "OB REJECT" signal. The I/O port initiating the OB bus cycle will recognize this signal, terminate the OB bus cycle, and retain the OB message in its input OB FIFO. It will then continue to arbitrate for the OB bus and repeat its attempt to perform the OB message transfer until the OB only cascade I/O port eventually accepts the OB message.

The above described simplex switch 14 thereby provides a design scheme wherein (i) the input OB FIFO buffer is able to transfer OB frames to the OB bus faster than it can receive OB frames from the switch-to-switch switch interface, thereby preventing overrun of the input OB FIFO buffer at the OB only cascade I/O port, and (ii) the output OB FIFO buffer is able to reject OB bus cycles when its condition is full thereby preventing overrun of the output OB FIFO buffer. This preferred design scheme permits controlled message flow at a PIO module 22 operating in cascade configuration without increasing the size the input and output OB FIFO buffers 32, 36 in that module. Thus, the I/O ports associated with the switch may be used in either a subsystem attached configuration a cascaded configuration, without uniquely designing expanded buffer sizes at I/O ports operating in a cascade configuration.

Accordingly, the preferred embodiment of a high performance cascadable simplex switch has been described. With the foregoing description in mind, however, it is understood that this description is made only by way of example, that the invention is not limited to the particular embodiments described herein, and that various rearrangements, modifications and substitutions may be implemented without departing from the true spirit of the invention as hereinafter claimed.

We claim:

1. A switching device for a data communications system, comprising:
    a first simplex serial crossbar switch including a plurality of first I/O ports each of which is adapted to be connected to either (i) a communications subsystem which passes data and control messages to other communications subsystems via said first simplex serial crossbar switch or (ii) one of a plurality of second I/O ports on a second simplex serial crossbar switch;
    each of said plurality of first I/O ports having programmable latches for alternatively programming each of said first I/O ports to be connected to either (i) a communications subsystem, wherein a single first I/O port is connected to a single subsystem and said single first I/O port manages both data and control messages sent to and from the connected single subsystem, or (ii) one of said plurality of second I/O ports on said second simplex switch, and wherein one of said pair of second simplex switch, and wherein one of said pair of first I/O ports manages the transfer of data and the other of said pair of first I/O ports manages the transfer of control messages.

2. The switching device of claim 1, wherein each of said plurality of first I/O ports is provided with an input buffer and an output buffer for storing, respectively, incoming and outgoing control messages.

3. The switching device of claim 2, wherein each of said plurality of first I/O ports is connected to an internal switching fabric via dedicated data input buses and dedicated data output buses over which is passed, respectively, incoming and outgoing data.

4. The switching device of claim 2, wherein said input buffer for each of said first I/O ports connected to one of said plurality of second I/O ports on said second simplex serial crossbar switch transfers control messages, to a control message bus connecting each of said plurality of first I/O ports, faster than it can receive control messages from said second complex switch.

5. The switching device of claim 4, wherein said output buffer for each of said first I/O ports connected to one of a said plurality of second I/O ports on said second simplex serial crossbar switch rejects control messages if it is in a full condition.

6. The switching device of claim 2, wherein said plurality of first I/O ports comprises sixteen I/O ports provided by eight port modules each having a pair of I/O ports.

7. A data communications system comprising:

a first simplex serial crossbar switch having a plurality of first I/O ports of which (i) at least one of said plurality of first I/O ports is connected to a communications subsystem which passes data and control messages to other communications subsystems via said first simplex serial crossbar switch, and (ii) at ;least one of said plurality of first I/O ports is connected to a corresponding one of a plurality of second I/O ports on a second simplex serial crossbar switch, said second simplex serial crossbar switch also provided with at least one second I/O port which is connected to a communications subsystem which passes data and control messages to other communications subsystems via the second simplex serial crossbar switch;

each of said plurality of first I/O ports on said first serial simplex switch having programmable latches for alternatively programming each of said first I/O ports to be connected to either (i) a communications subsystem, wherein a single first I/O port is connected to a single subsystem and said single first I/O port manages both data and control messages sent to and from the connected single subsystem, or (ii) one of said plurality of second I/O ports on said second simplex switch, wherein a pair of first I/O ports on said first switch are connected to a pair of similarly configured second I/O ports on said second simplex switch, and wherein one of said pair of first I/O ports manages the transfer of data and the other of said pair of first I/O ports manages the transfer of control messages.

8. The system of claim 7, wherein each of said plurality of first I/O ports on said first simplex switch and each of said plurality of second I/O ports on said second simplex switch are provided with an input buffer and an output buffer for storing, respectively, incoming and outgoing control messages.

9. The system of claim 8, wherein each of said plurality of first I/O ports on said first simplex switch and each of said plurality of second I/O ports on said second simplex switch is connected to an internal switching fabric via dedicated data input buses and dedicated data output buses over which is passed, respectively, incoming and outgoing data.

10. The system of claim 8, wherein said input buffer for each of said first I/O ports connected to one of a said plurality of second I/O ports on said second simplex serial crossbar switch transfers control messages to control message bus connecting each of said plurality of first I/O ports on said first simplex switch faster than it can receive control messages from said second simplex switch.

11. The simplex switch of claim 10, wherein said output buffer for each of said first I/O ports connected to one of said plurality of second I/O ports on said second simplex serial crossbar switch rejects control messages if it is in a full condition.

12. The simplex switch of claim 8, wherein each of said first and second serial crossbar simplex switches has sixteen I/O ports provided by eight port modules each having a pair of I/O ports.

* * * * *

UNITED STATES PATENT AND TRADEMARK OFFICE
CERTIFICATE OF CORRECTION

PATENT NO. : 5,309,426
DATED : May 3, 1994
INVENTOR(S) : Richard S. Crouse, John J. Cazzolla, Luke L. Chang,
Marco M. Hurtado, Kha D. Nguyen, Jose L. Rivero,
Jose J. Ruiz, Louis Salcedo It is certified that error appears in the above-indentified patent and that said Letters Patent is hereby corrected as shown below:

Claim 1, line 39 delete " and wherein one of said pair of"

and insert therefor -- wherein a pair of first I/O ports on said first switch are connected to a pair of similarly configured second I/O ports on said --

Signed and Sealed this

Sixth Day of January, 1998

Attest:

BRUCE LEHMAN

Attesting Officer

Commissioner of Patents and Trademarks